United States Patent [19]

Chin et al.

[11] Patent Number: 5,240,981
[45] Date of Patent: Aug. 31, 1993

[54] FLAME RETARDANT POLYIMIDE SYSTEM

[75] Inventors: Benjamin G. Chin, Croton-on-Hudson; Roger Tietze, Baldwin, both of N.Y.

[73] Assignee: Ciba-Geigy Corporation, Ardsley, N.Y.

[21] Appl. No.: 709,905

[22] Filed: Jun. 3, 1991

[51] Int. Cl.$^5$ .......................... C08K 5/04; C08K 5/16; C08K 5/20
[52] U.S. Cl. .................................. 524/234; 427/389.8; 428/261; 428/377; 428/392; 428/396; 428/473.5; 524/83; 524/233; 524/356; 524/376; 524/378; 525/422; 526/262; 528/322
[58] Field of Search ................. 524/83, 233, 356, 376, 524/378, 234, ; 525/422; 526/262; 528/322; 428/473.5, 261, 377, 392, 396; 427/389.8

[56] References Cited

U.S. PATENT DOCUMENTS

| | | | |
|---|---|---|---|
| 4,100,140 | 7/1978 | Zahir et al. | 526/90 |
| 4,826,927 | 5/1989 | Schmid et al. | 525/422 |
| 4,927,907 | 5/1990 | Corley | 528/322 |
| 5,070,154 | 12/1991 | Shiobara et al. | 525/422 |
| 5,077,363 | 12/1991 | Eisenbarth et al. | 526/262 |

Primary Examiner—Joseph L. Schofer
Assistant Examiner—J. M. Reddick
Attorney, Agent, or Firm—JoAnn Villamizar

[57] ABSTRACT

The present invention relates to a polyimide resin composition and products, especially storage stable polyimide pre-pregs, manufactured therefrom with improved processing properties comprising (A) the reaction product of a polyimide, an alkenylphenol or an alkenylphenol ether, and tribromophenyl-maleimide, (B) an ionic or free-radical polymerization catalyst and (C) phenothiazine derivatives.

20 Claims, No Drawings

FLAME RETARDANT POLYIMIDE SYSTEM

BACKGROUND OF THE INVENTION

It is known that polymaleimides can be utilized for the preparation of various polyaddition and polymerization products. Particular emphasis has been placed on bis-maleimide materials which exhibit thermal stability and good mechanical properties and, thus, are being more frequently utilized in high performance composite applications, such as electronic circuit board applications.

The currently used bis-maleimide systems include alkenyl phenols as coreactants. U.S. Pat. Nos. 4,100,140; 4,127,615; 4,130,600 and 4,131,632 are examples of patents which disclose crosslinked polymers resulting from the reaction of polymaleimides with alkenyl phenols or alkenyl phenols ethers optionally in the presence of epoxy resins.

A standard polyimide pre-preg for use in electronic circuit board applications is based on bis-maleimidodiphenyl methane and diallylbisphenol A. The product normally must be stored at refrigerated temperatures due to the instability and advancement of the resin system at higher temperatures and does not meet the Underwriters Laboratory VO requirement for commercial flame retardancy.

It is a primary object of the present invention to provide a flame retardant polyimide resin system which substantially eliminates the disadvantages encountered with prior art materials.

It is a further object to provide such a flame retardant polyimide resin system without any substantial adverse impact on the thermal and mechanical properties thereof.

It is a still further object to provide a flame retardant polyimide resin system with improved solubility which forms a stable polyimide resin solution.

Various other objects and advantages of this invention will become apparent from the following descriptive material.

It was discovered that the addition and reaction of the tribromophenyl-maleimide into the polyimide resin system in accordance with the present invention provides flame retardancy while not imparting the processing parameters or the thermal, mechanical, chemical or electrical properties of the products manufactured therefrom. In particular, the flame retardant polyimide resin system of the present invention provides pre-pregs with substantially improved storage stability. Thus, the flame retardant polyimide resin composition in accordance with the present invention provides manufactured pre-pregs which can be stored at room temperature without adverse effects to processing conditions.

Surprisingly, the addition of the tribromophenyl-maleimide does not adversely effect the processing characteristics of the polyimide resin system. For example, the extended pot-life of the resin system in accordance with the present invention is not effected which provides improved processability for the manufactured products, especially pre-pregs; the residual volatile content in the pre-preg is unchaged, and the shortened curing rate for the resin system is not effected. Accordingly, the flame retardant polyimide resin composition in accordance with the present invention provides improved coating and processing conditions for higher quality material.

The flame retardant resin systems have application in a broad range of end uses such as in printed circuit boards, castings, composites, molding compounds, adhesives and coatings.

SUMMARY OF THE INVENTION

The present invention relates to a flame retardant polyimide resin composition comprising
 (A) the reaction product of
  (a) a polyimide containing at least two radicals of the formula

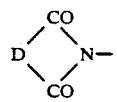

wherein D is a divalent radical containing a C=C bond,
  (b) from about 0.05 to 2.0 moles per mole component (a) of an alkenyl phenol, an alkenyl phenol ether or mixtures thereof, and
  (c) tribromophenyl-maleimide;
 (B) an ionic or free-radical polymerization catalyst; and
 (C) a phenothiazine or a derivative thereof.

DETAILED DESCRIPTION OF THE INVENTION

Applicable polyimides contain at least two radicals of the formula

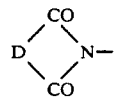

wherein D is a divalent radical containing a C=C bond. These polyimides are known compounds and are described, for example, in U.S. Pat. No. 4,100,140. They are preferably polyimides of the formula

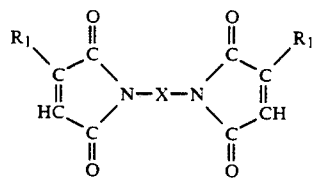

wherein $R_1$ is hydrogen or methyl and X is a divalent organic radical with 2-30 carbon atoms and, more particularly, $C_xH_{2x}$— with 2-20, —$CH_2CH_2SCH_2CH_2$—, phenylene, naphthylene, xylylene, cyclopentylene, 1,5,5-trimethyl-1,3-cyclohexylene, 1,4-cyclohexylene, 1,4-bis(methylene)-cyclohexylene, and groups of the formula

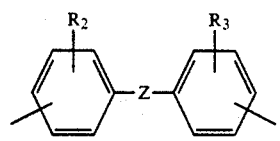

wherein $R_2$ and $R_3$ independently are chlorine, bromine, methyl, ethyl or hydrogen, and Z is a direct bond or methylene, 2,2-propylidene, —CO—, —O—, —S—, —SO— or —SO$_2$—. Bismaleimides which are particularly preferred are those in which R$_1$ is hydrogen, X is hexamethylene, trimethylhexamethylene, 1,5,5-trimethyl-1,3-cyclohexylene, or a group of the indicated formula in which Z is methylene, 2,2-propylidene or —O—.

The substances which follow may be mentioned as specific examples of known polyimides which are suitable for use in this invention: N,N'-ethylene-bis-maleimide, N,N'-hexamethylene-bis-maleimide, N,N'-m-phenylene-bis-maleimide, N,N'-p-phenylene-bis-maleimide, 4,4'-bismaleimidodiphenylmethane (this is preferably employed), N,N'-4,4'-3,3'-dichloro-diphenylmethane-bis-maleimide, N,N'-4,4'-(diphenyl ether)bis-maleimide, N,N'-4,4'-di-phenylsulphone-bis-maleimide, N,N'-4,4'-(dicyclohexylmethane-bis maleimide, N,N'-α,α', -4,4'-dimethylenecyclohexane-bis-maleimide, N,N'-m-xylylene-bis-maleimide, N,N'-p-xylylene-bis-maleimide, N,N'-4,4'-diphenylcyclohexane-bis-maleimide, N,N', m-phenylene-bis-citraconimide, N,N'-4,4'-diphenylmethane-bis-citraconimide, N,N'-4,4'-2,2-diphenylpropane-bis-maleimide, N,N'-α,α'-1,3-dipropylene-5,5-dimethyl-hydantoin-bis-maleimide, N,N'-4,4'-diphenylmethane-bis-itaconimide, N,N'-p-phenylene-bis-itaconimide, N,N'-4,4'-diphenylmethane-bis-dimethylmaleimide, N,N'-4,4'-2,2'-diphenylpropane-bis-dimethylmaleimide, N,N'-hexamethylene-bis-dimethylmaleimide, N,N'-4,4'-(diphenyl ether)-bis-dimethylmaleimide and N,N'-4,4'-diphenylsulphone-bis-dimethylmaleimide.

According to the invention, allylphenols and methallylphenols, or the ethers thereof, are preferably employed as the alkenylphenols are alkenylphenol ethers. Both mononuclear and polynuclear, preferably binuclear, alkenylphenols and alkenylphenol ethers can be employed. Preferably, at least one nucleus contains both an alkenyl group and a phenolic, optionally etherified OH group.

As is known, alkenylphenols are manufactured by rearrangement of the alkenyl ethers of phenols (for example of the allyl ether of phenol) by the action of heat (Claisen rearrangement). These alkenyl ethers are also obtained according to known processes by reacting phenols and, for example, allyl chloride in the presence of an alkali metal hydroxide and solvents. As is known, a condensation reaction takes place (elimination of an alkali metal chloride).

Typical examples are:
Compounds of formula I

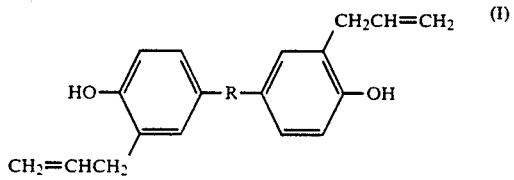

wherein R is a direct bond, methylene, isopropylidene, —O—, —S—, —SO— or —SO$_2$;

Propenyl-substituted phenols of formula II

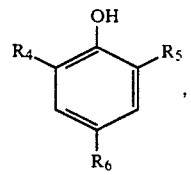

wherein R$_4$, R$_5$ and R$_6$ are each independently a hydrogen atom or C$_2$–C$_{10}$ alkenyl, preferably, an allyl or propenyl group, with the proviso that at least one of R$_4$ to R$_6$ is alkenyl, preferably a propenyl group;

Compounds of formula III

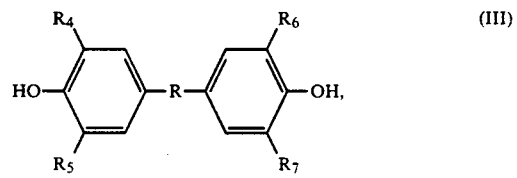

wherein R$_4$, R$_5$, R$_6$ and R$_7$ are each independently a hydrogen atom or C$_2$–C$_{10}$ alkenyl, preferably an allyl or propenyl group, with the proviso that at least one of R$_4$ to R$_7$ is alkenyl, preferably a propenyl group, and R is as defined for formula I; and Compounds of formula IV

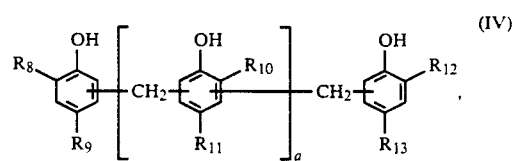

wherein R$_8$, R$_9$, R$_{10}$, R$_{11}$, R$_{12}$ and R$_{13}$ are each independently a hydrogen atom, C$_1$–C$_4$ alkyl, C$_2$–C$_{10}$ alkenyl, preferably allyl or propenyl, with the proviso that at least one of R$_8$ to R$_{13}$ is alkenyl, preferably a propenyl group, and a is a value from 0 to 10.

Compounds of formula III are preferred in which each of R$_4$ and R$_6$ is a propenyl group and each of R$_5$ and R$_7$ is a hydrogen atom and R is methylene, isopropylidene or —O—.

It is also possible to use mixtures or isomers of propenyl- and allyl-substituted mono- or polyhydric phenols. Among the mixtures of isomers it is preferred to use mixtures of propenyl- and allyl-substituted phenols of formula III, preferably those which are obtained by partial isomerization of allyl-substituted phenols of formula IIIa

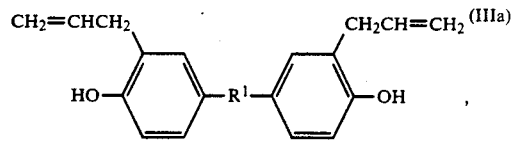

wherein R$^1$ is methylene, isopropylidene or —O—.

According to the invention, the use of mixtures of polynuclear alkenylphenols and/or alkenylphenol ethers with mononuclear alkenylphenols and/or alkenylphenol ethers also gives good results. The alkenylphenol ethers preferably employed are those substances which contain one or more molecular radicals of the formula V $$-O-R_3 \qquad (V)$$

in which $R_3$ denotes an alkyl radical with 1 to 10 C atoms, an aryl radical or an alkenyl radical, preferably allyl or methallyl, the O atom in formula V representing the phenolic ether bridge.

A further embodiment of the invention is the use of mixtures of those substances which contain only one OH group and only one alkenyl group on the aromatic nucleus with substances which contain several OH groups and/or several alkenyl groups on the aromatic nucleus, or of mixtures of the corresponding phenol ethers of these substances. The corresponding methallyl compounds can also be used.

Such alkenyl-substituted phenols and polyols are disclosed e.g. in U.S. Pat. No. 4,100,140 and 4,371,791.

Typical materials include O,O'-diallyl-bisphenol A, 4,4'-dihydroxy-3,3'-diallyldiphenyl, bis(4-hydroxy-3-allylphenyl)methane, 2,2-bis(4-hydroxy-3,5-diallylphenyl)propane, eugenol, O,O'-dimethallyl-bisphenol A, 4,4'-dihydroxy-3,3'-dimethallyldiphenyl, bis(4-hydroxy-3-methallylphenyl)methane, 2,2-bis(4-hydroxy-3,5-dimethallyphenyl)-propane, 4-methallyl-2-methoxyphenol, 2,2-bis(4-methoxy-3-allylphenyl)propane, 2,2-bis(4-methoxy-3-methallylphenyl)propane, 4,4'-dimethoxy-3,3'-diallyldiphenyl, 4,4'-dimethoxy-3,3'-dimethallyldiphenyl, bis(4-methoxy-3-allylphenyl)methane, bis(4-methoxy-3-methallylphenyl)methane, 2,2-bis(4-methoxy-3,5-diallylphenyl)propane, 2,2-bis(4-methoxy-3,5-dimethallylphenyl)propane, 4-allylveratrole and 4-methallyl-vetratrole.

In terms of relative concentration, the alkenyl phenol component or a mixture thereof is employed in a range of 0.05 to 2.0 moles per mole of maleimide, and preferably in a range of 0.1 to 1.0, and most preferably in a 1:1 molar ratio.

The tribromophenyl-maleimide of the formula VI

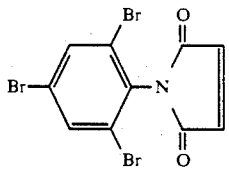

(VI)

provides the composition of the present invention with flame retardant properties while not imparing the processing properties or the thermal, mechanical, chemical or electrical properties of the products made therefrom. The tribromophenyl-maleimide is present in a concentration of from about 1 to about 25%, and preferably from about 8 to about 15%, by weight based on the total weight of component (A).

The resulting reaction product using this tribromophenyl-maleimide is unique because the flame retardant halogen is fully reacted into the polymer network. Other techniques involve the addition of flame retardants to polyimide formulations, but typically these additives are not fully reacted into the polymer, and thus processing properties are sacrificed. For example, bromonated epoxies or phenols can be added to polyimide resins, however, they will degrade the thermal properties of the polyimide composite. The reaction product of the bismaleimide, allyl phenol and tribromophenyl-maleimide exhibits improved flame retardant properties while retaining all processing properties of a polyimide resin system.

The resin system further comprises either ionic or free-radical polymerization catalysts. These should be present in a concentration of 0.1 to 10% by weight, preferably 0.1 to 5% by weight, based on the total amount of the reactants.

Amongst the ionic catalysts, those which are suitable according to the invention are, in particular, tertiary, secondary and primary amines or amines which contain several amino groups of different types (for example mixed tertiary/secondary amines) and quaternary ammonium compounds. These amine catalysts can be either monoamines or polyamines. When primary and secondary amines are used, monoamines are to be preferred. The substances which follow are to be listed as examples of such amine catalysts: diethylamine, tripropylamine, tributylamine, triethylamine, triamylamine, benzylamine, tetramethyldiaminodiphenylmethane, N,N-diisobutylaminoacetonitrile, N,N-dibutylaminoacetonitrile, heterocyuclic bases, such as quinoline, N-methylpyrrolidine, imidazole, benzimidazloe and their homologues, and also mercaptobenzothiazole. Examples of suitable quaternary ammonium compounds which may be mentioned are benzyltrimethylammonium hydroxide and benzyltrimethylammonium methoxide. Tripropylamine is preferred.

Further suitable ionic catalysts are alkali metal compounds, such as alkali metal alcoholates and alkali metal hydroxides. Sodium methylate is particularly suitable.

Suitable free-radical polymerization catalysts are the known organic peroxides and hydroperoxides as well as azoisobutyronitrile. In this case also, the preferred concentration is 0.1 to 5.0% by weight.

Further polymerization catalysts which can be employed for the process according to the invention are acetyl-acetonates, especially the acetyl-acetonates of the transition metals. The corresponding vanadium compound is to be singled out in particular. These special polymerization catalysts are also employed in the concentration already mentioned above.

Phenothiazine itself has been found to be an especially good inhibitor. In addition, C-substituted phenothiazines which have one to three substituents and N-substituted phenothiazines which have one substituent selected from the group consisting of $C_1-C_6$ alkyl, for example, 3-methyl-phenothiazine, 3-ethyl-phenothiazine, 10-methyl-phenothiazine; aryl, for example, 3-phenyl-phenothiazine, 3,7-diphenyl-phenothiazine; halogen such as chlorine, bromine and iodine, for example, 3-chlorophenothiazine, 2-chlorophenothiazine, 3-bromophenothiazine; nitrogen functional groups, for example, 3-nitrophenothiazine, 3-aminophenothiazine, 3,7-diaminophenothiazine; and sulfur functional groups, for example, 3-sulfonyl-phenothiazine, 3,7-disulfonyl-phenothiazine, 3,7-dithiocyanatophenthiazine are also useful inhibitors of the invention. Furthermore, N,N'-dimers of phenothiazine and substituted N,N' dimers of phenothiazine are also useful inhibitors of the invention. Preferable phenothiazines contain from 0 to 1 substituents.

The phenothiazines are generally used in an amount ranging from about 0.5 to about 10 parts per hundred of resin and preferably in an amount ranging from about 0.5 to about 2 parts per hundred of resin.

The flame retardant polyimide compositions of the present invention can furthermore be mixed, at any stage before cure, with ususal modifiers such as extenders, fillers and reinforcing agents, pigments, dyestuffs, organic solvents, plasticizers, tackifiers, rubbers, accelerators, diluents and the like. As extenders, reinforcing agents, fillers and pigments which can be employed in the curable mixtures according to the invention there may be mentioned for example: coal tar, bitumen, glass fibers, boron fibers, carbon fibers, cellulose, polyethylene powder, polypropylene powder, mica, asbestos, quartz powder, gypsum, antimony trioxide, bentones, silica aerogel ("aerosil"), lithopone, barite, titanium dioxide, carbon black, graphite, iron powder. It is also possible to add other usual additives, for example, agents for conferring thixotropy, flow control agents such as silicones, cellulose acetate butyrate, polyvinyl butyrate, waxes, stearates and the like (which are in part also used as mold release agents) to the curable mixtures.

The flame retardant polyimide compositions are suitable for the manufacture of printed circuit boards, castings, composites, molding compounds, adhesives and coatings. The flame retardant polyimide compositions of the present invention are particularly suitable for the manufacture of pre-pregs which are suitable for use in the above-mentioned applications.

The invention further relates to a process for preparing a prepreg containing imide groups comprising reacting at an elevated temperature (a) a polyimide containing at least two radicals of the formula

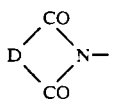

wherein D is a divalent radical containing a C=C bond, (b) from about 0.05 to 2.0 moles per mole of component (a) of an alkenyl phenol, an alkenyl phenol ether or mixtures thereof, and (c) tribromophenyl-maleimide; in the presence of an ionic or free-radical polymerization catalyst for a period of time sufficient to provide said reaction product with a resin melt viscosity of from about 20 to 85 poise as measured on an ICI Cone & Plate Viscometer at 125° C.; adding a phenothiazine or a derivative thereof in sufficient solvent to provide a solid content of between about 40 to about 60%; a glass fiber with an appropriate adhesion promoter is then impregnated with the resin solution; and the fabric is then heated at about 150°-170° C. to remove the solvent and form a prepreg.

For the manufacture of a pre-preg, the method of preparation of the reaction products of the present invention is established in order to obtain prepolymers of predetermined advancement. A key element is the amount of catalyst utilized in the advancement reaction. The applicable concentrations of catalyst are set forth hereinabove. In selecting the reaction conditions, a practitioner must strike a balance between catalyst concentration and the other process variable inasmuch as higher catalyst concentrations tend to maximize the increase in solution stability while lower amounts within the range will improve other characteristics in preference to solution stability. This balancing of variables will also permit the use of catalyst concentrations somewhat beyond the lower and upper limits. However, catalyst concentrations falling significantly below the minimum concentration do not yield resins with improved solution of storage stability, while catalyst concentrations substantially exceeding the prescribed maximum will tend to gel the resin solution during preparation or to produce resins with high resin solution viscosities and with inferior mechanical and thermal properties.

Correspondingly, the degree of resin advancement is a function of reaction time and temperature after catalyst addition. This advancement parameter is to be monitored by the measurment of resin melt viscosity. Resin melt viscosity is measured with an ICI Cone & Plate Viscometer using a 0-100 poise scale at 125° C. and will generally range from 20 to 85 poise, and preferably 50-70 poise, for the advanced resin systems. Gel time may be used as an additional parameter and reflects the time to total gel formation as determined at a temperature of 170° C. and will generally range from about 80 to 550 seconds for the advanced resin systems of this invention.

The advancement procedure thus involves blending the bismaleimide, tribromophenyl maleimide and the alkenylphenol or alkenylphenol ether and heating the blend at a temperature of from 25° to 125° C. until a clar melt is obtained. Thereafter, the catalyst is added and the reaction continued for the appropriate amount of time at temperatures ranging from 110° to 130° C. Thereafter, the phenothiazine in an amount set forth hereinbefore dissolved in the desired solvent system is added to the resin. High solids (up to about 75%, by weight, preferably 60% by weight), generally low viscosity solutions are thus prepared which are directly available for impregnating glass or other fabrics or fibers for laminate preparation. A wide variety of low boiling solvents (boiling points up to about 160° C. and preferably up to about 100° C.) may be used including ketones such as acetone, methyl ethyl ketone and methyl isobutyl ketone; glycol ethers and glycol ether acetates such as propylene glycol methyl ether, propylene glycol methyl ether acetate, ethylene glycol methyl ether, ethylene glocoyl ethyl ether and glycol ethyl ether acetate; hydrocarbons such as toluene and anisole; methoxy propanol; dimethylformamide; and mixtures thereof; with the ketones and ketone/ether blends (preferably 1:1) being of particular interest. Blends of ketone with certain high boiling solvents are also applicable.

Prepolymers such as those described above have application in a broad range of end uses such as in printed circuit boards, castings, composites, molding compounds, adhesives and coatings. Thus, the modified resin solutions or melts are utilized to impregnate various fibers or fabrics for eventual use in printed circuit boards or various laminating applications. Techniques for preparing laminates are well known. Such laminates may be prepared by compression of autoclave molding and may comprise a broad range of thicknesses. Techniques for prepaing prepregs are well known to those skilled in the art. In terms of preparing honeycomb skins and structural parts, graphite, glass and Kevlar reinforced skins and parts as well as others can be readily prepared from the instant systems.

A preferred laminate or prepreg structure comprises the cured product of a woven fabric or woven yarn impregnated with a flame retardant composition comprising (A) the reaction product of (a) a polyimide containing at least two radicals of the formula

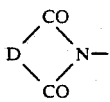

wherein D is a divalent radical containing a C=C bond,
(b) from about 0.05 to 2.0 moles per mole of component (a) of an alkenyl phenol, an alkenyl phenol ether or mixtures thereof, and
(c) tribromophenyl-maleimide; and
(B) an ionic or free-radical polymerization catalyst; and
(C) phenothiazine or a derivative thereof which is dissolved in a non-aqueous solvent medium.

In a preferred embodiment, the polyimie solution (60% solids) is diluted with an appropriate solvent to give the desired solution viscosity range. A glass fabric with the appropriate adhesion promoter is dipped into the resin solution in order to impregnate the fabric. The fabric is then heated in a an oven at 150°-170° C. to remove the volative solvents and to advance the resin to the desired flow and gel reactivity stage. The prepregs are then compression molded at 177° C. for 3 hours and post cured for 4 hours at 240° C. to form the final composite laminate.

The prepolymers prepared according to the invention can furthermore be mixed, at any stage before cure, with the usual modifiers and additives as set forth hereinabove.

The heat curable composition in accordance with the present invention produces prepregs which can be stored at room temperature without adverse effects to processing conditions and results in improved coating and processing conditions.

The following examples illustrate the preferred embodiments of this invention. In these examples, all parts given are by weight unless otherwise noted.

EXAMPLE 1

This example illustrates the preparation of a typical heat curable composition of the present invention.

| Formulation | Parts by Weight |
|---|---|
| XU 292A (bismaleimidodiphenylmethane) (from CIBA-GEIGY Corporation, Ardsley, NY) | 28.93 |
| XU 292B (Diallyl Bisphenol A) (from CIBA-GEIGY Corporation, Ardsley, NY) | 24.84 |
| FR 1033 (Tribromophenyl-maleimide) (from Dead Sea Bromine, Ltd., Israel) | 5.97 |
| Tripropylamine | 0.38 |
| Phenothiazine | 0.98 |
| Methylethylketone | 19.46 |
| Dowanol PM (methoxy propanol) (from Dow Chemical Company, Midland, Michigan) | 19.46 |

Diallyl Bisphenol A is charged to a reaction flask including a mixer and agitator, condenser and a sampling opening and heated to 120° C. with stirring Bismaleimidodiphenylmethane and tribromophenyl-maleimide are added to the reaction flask with stirring. After the materials are thoroughly blended, the reaction vessel is placed under vacuum for 30 minutes (≦50 mm/Hg). A sample if then removed and the viscosity and gel time are measured. When the gel time is 500-700 seconds at 171° C. and the viscosity is less than 10 poise at 100° C. as measured on an ICI viscometer, the reaction mixture is cooled to 110° C. and tripropylamine is added to the flask and stirring is continued for 30 minutes. Thereafter, the reaction mixture is placed under vacuum for 1 hour. The temperature is then increased to 120° C. and maintained for 30 minutes. The vacuum is then removed and a sample is again tested for gel time and viscosity. The reaction mixture is stirred and maintained at at temperature of 120° C. until the gel time is 150-250 seconds at 171° C. and the viscosity is 40-60 poise at 125° C. The methyl ethyl ketone is then added after the heat is removed. The reaction mixture is then allowed to cool to ≦50° C. whereupon the phenothiazine and methoxy propanol are added. The reaction mixture is then allowed to cool to room temperature with stirring. The resulting solution is then discharged from the reaction vessel and filtered through a 10 micron filter.

EXAMPLE 2

This example illustrates the preparation of a heat curable composition was prepared as a control.

| Formulation | Parts by Weight |
|---|---|
| XU 292A (bismaleimidodiphenylmethane) (from CIBA-GEIGY Corporation, Ardsley, NY) | 31.88 |
| XU 292B (Diallyl Bisphenol A) (from CIBA-GEIGY Corporation, Ardsley, NY) | 27.30 |
| Tripropylamine | 0.38 |
| Phenothiazine | 0.99 |
| Methylethylketone | 19.73 |
| Dowanol PM (methoxy propanol) (from Dow Chemical Company, Midland, Michigan) | 19.73 |

Bismaleimidodiphenylmethane and diallyl Bisphenol A are added and mixed together in a reaction flask and heated to 120° C.-135° C. Tripropylamine is added to the flask and stirring is continued for 2 hours. Samples are then removed from the flask and tested for their melt viscosity at 125° C. and their gel time at 171° C. When the melt viscosity of the resin reaches 40 poise, methyl ethyl ketone, methoxy propanol and phenothiazine are added to the reaction flask with continued stirring for a period of 2-4 hours to form the final resin product which is discharged from the reaction flask. The final resin product has a solids content of 60.0%, a gel time of 340 secs at 171° C. and a viscosity of 300 cps at 25° C.

EXAMPLE 3

This example illustrates the preparation of a heat curable composition using Tetrabromo Bisphenol A as an additive to the polyimide resin system to impart flame retardancy.

| Formulation | Parts by Weight |
|---|---|
| XU 292A | 30.36 |
| XU 292B | 26.04 |
| Tripropylamine | 0.36 |
| Methylethylketone | 18.8 |
| Dowanol PM | 18.8 |
| Tetrabromo Bisphenol A | 6.0 |

The preparation of the resin follows the procedure in Example #2 except that no phenothiazine is added, and the Tetrabromo Bisphenol A is blended into the final mixture at the end of the reaction as a flame retardant additive which is not reacted into the polymer.

EXAMPLE 4

The resin products from Examples 1, 2 and 3 are prepared into pre-pregs by coating them onto woven glass fabric from Clark Schwebel. The fabric style is either 7628 or 2116 with a CS 309 finish. The material is B-staged at 190° C. for 3 min and the resulting pre-pregs are then hydraulically pressed at 177° C. for 3 hrs and post cured at 240° C. for 4 hrs. These finished laminates are then tested for themal properties and flame retardant properties. Flame retardant testing of electrical laminates are performed as per the test procedures specified by Underwriters Laboratory for UL 94 Vl and VO classification. Five laminate samples are prepared and subected to an open flame. The times and length of burn is measured and compared against the standards for Vl and VO classification. A 94 VO classification indicates good flame retardancy and minimum burn times that are requird for electronic products used for commercial consumer applications.

| Properties | Example 1 | Example 2 | Example 3 |
|---|---|---|---|
| Construction (# of plies/glass) | 8/2116 | 8/2116 | 8/7628 |
| Resin Content | 50% | 50% | 33% |
| Glass Transition Temperature | 250 C. | 250 C. | 170 C. |
| Decomposition Temp. | 400 C. | 410 C. | 286 C. |
| Average burn time per specimen | 3.7 secs | 24.0 secs | 4.5 secs |
| UL 94 classification | VO | V1 | VO |

The control formulation exhibits a high burn time which classifies the product as UL Vl which is not adequate for consumer product specification. The Tetrabromo Bisphenol A additive improves the flame retardancy, but the theraml properties are diminished and the resulting laminate is of very poor quality and decomposed during post cure. The resulting polymer of example 1 in accordance with the present invention comprising the tribromophenyl-maleimide/bis-maleimide/allylphenol exhibits lower burn times which allows classification into the 94 VO category. In addition, thermal and processing properties are maintained.

What is claimed is:

1. A flame retardant polyimide composition comprising
    (A) the reaction product of
        (a) a polyimide containing at least two radicals of the formula

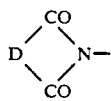

wherein D is a divalent radical containing a C=C bond,
        (b) from about 0.05 to 2.0 moles per mole of component (a) of an alkenyl phenol, an alkenyl phenol ether or mixtures thereof, and
        (c) tribromophenyl-maleimide; and
    (B) an ionic or free-radical polymerization catalyst; and
    (C) phenothiazine or a derivative thereof.

2. The composition according to claim 1, wherein component (a) corresponds to the formula

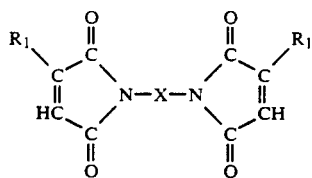

wherein R is hydrogen or methyl and X is a divalent organic radical with 2-30 carbon atoms.

3. The composition of claim 2, wherein X is $C_xH_{2x}$—with x=2-20, —CH$_2$CH$_2$SCH$_2$CH$_2$—, phenylene, naphthylene, xylylene, cyclopentylene, 1,5,5-trimethyl-1,3-cyclohexylene, 1,4-cyclohexylene, 1,4-bis(methylene)-cyclohexylene, and groups of the formula

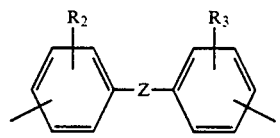

wherein $R_2$ and $R_3$ independently are chlorine, bromine, methyl, ethyl, or hydrogen, and Z is a direct bond or methylene, 2,2-propylidene, —CO—, —O—, —S—, —SO—, or —SO$_2$—.

4. The composition of claim 3, wherein $R_1$ is hydrogen and Z is methylene, 2,2-propylidene of —O—.

5. The composition of claim 4, wherein component (a) is 4,4'-bismaleimidodiphenylmethane.

6. The composition of claim 1, wherein component (b) is an alkenyl phenol selected from the group consisting of
    a) of the formula (III)

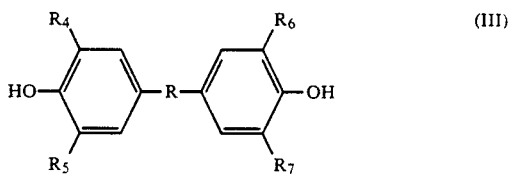

wherein R is a direct bond, methylene, isopropylidene, —O—, —S—, —SO— or —SO$_2$—; and $R_4$, $R_5$, $R_6$ and $R_7$ are independently hydrogen or $C_2$-$C_{10}$ alkenyl, with the proviso that at least one of $R_4$-$R_7$ is an alkenyl group;
    b) of the formula (II)

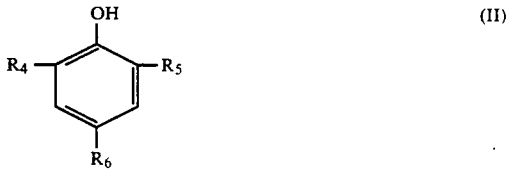

wherein $R_4$, $R_5$ and $R_6$ are independently hydrogen or $C_2$-$C_{10}$ alkenyl, with the proviso that at least one of $R_4$-$R_6$ is alkenyl; and
    c) of the formula (IV)

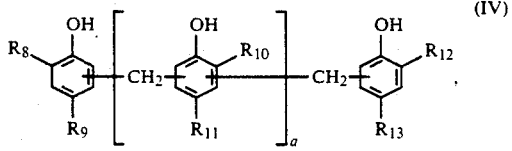

wherein $R_8$, $R_9$, $R_{10}$, $R_{11}$, $R_{12}$ and $R_{13}$ are independently hydrogen, $C_1-C_4$ alkyl or $C_2-C_{10}$ alkenyl, with the proviso that at least one of $R_8-R_{13}$ is alkenyl; or the ether thereof containing at least one $-OR_3$ radical wherein $R_3$ is $C_1-C_{10}$ alkyl, aryl or alkenyl and a is a value from 0 to 10.

7. The composition of claim 6, wherein said alkenyl group is allyl or propenyl.

8. The composition of claim 7, wherein said alkenyl phenol is O,O'-diallyl-bisphenol A.

9. The composition according to claim 1, wherein said tribromophenyl-maleimide is present in a concentration ranging from about 1 to about 25% by weight based upon the total weight of component (A).

10. The composition according to claim 9, wherein the tribromophenyl-maleimide is present in a concentration of 8 to about 15% by weight based upon the total weight of component (A).

11. The composition according to claim 1, which is dissolved in a non-aqueous solvent medium.

12. The composition according to claim 11, wherein said solvent medium is a ketone, glycol ether, glycol ether acetate, hydrocarbon, dimethylformamide or a mixture thereof, said solvent medium having a maximum boiling point of about 160° C.

13. The composition according to claim 1, wherein said phenothiazine derivative is selected from the group consisting of C-substituted phenothiazine which has one to three substituents selected from the group consisting of $C_1-C_6$ alkyl, aryl, halogen, nitrogen functional groups and sulfur functional groups; N-substituted phenothiazine which has one substituent slected from the group consisting of $C_1-C_6$ alkyl, aryl, halogen, nitrogen functional groups and sulfur functional groups; N,N'-dimers of phenothiazine and substituted N,N' dimers of phenothiazine.

14. The composition according to claim 1, wherein said component (C) is present in an amount of about 0.5 to about 2 parts per hundred of resin.

15. The composition according to claim 1, wherein said component (C) is phenothiazine.

16. The product obtained by removing the solvent of the composition of claim 11 and curing the resulting reaction product.

17. A laminate or prepreg structure comprising the cured product of a woven fabric or wound yarn impregnated with the composition of claim 11.

18. A process for preparing a prepreg containing imide groups comprising reacting at an elevated temperature (a) a polyimide containing at least two radicals of the formula

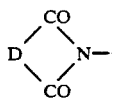

wherein D is a divalent radical containing a C=C bond, (b) from about 0.05 to 2.0 moles per mole of component (a) of an alkenyl phenol, an alkenyl phenol ether or mixtures thereof, and (c) tribromophenyl-maleimide; in the presence of an ionic or free-radical polymerization catalyst for a period of time sufficient to provide said reacion product with a resin melt viscosity of from about 20 to 85 poise as measured on an ICI Cone & Plate Viscometer at 125° C.; adding a phenothiazine or a derivative thereof in sufficient solvent to provide a solid content of between about 40 to about 60%; a glass fiber with an appropriate adhesion promoter is then impregnated with the resin solution; and the glass fiber is then heated at about 150°-170° C. to remove the solvent and form a prepreg.

19. The process of claim 18, wheein the polyimide (a) is 4,4'-bismaleimidodiphenylmethane, (b) is O,O'-diallylbisphenol A and the catalyst is tripopylamine.

20. The process of claim 18, wherein the solvent is a ketone, glycol ether, glycol ether acetate, hydrocarbon, dimethylformamide or a mixture thereof, said solvent medium having a maximum boiling point of about 160° C.

* * * * *